United States Patent
Simpson

(10) Patent No.: US 9,407,765 B2
(45) Date of Patent: *Aug. 2, 2016

(54) AUTOMATED PASSCODE RECOVERY IN AN INTERACTIVE VOICE RESPONSE SYSTEM

(71) Applicant: AT&T Intellectual Property I, L.P., Atlanta, GA (US)

(72) Inventor: Anita H. Simpson, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 33 days.

This patent is subject to a terminal disclaimer.

(21) Appl. No.: 14/058,795

(22) Filed: Oct. 21, 2013

(65) Prior Publication Data

US 2014/0044245 A1 Feb. 13, 2014

Related U.S. Application Data

(63) Continuation of application No. 12/776,943, filed on May 10, 2010, now Pat. No. 8,565,385, and a continuation of application No. 11/923,939, filed on Oct. 25, 2007, now Pat. No. 7,715,532, and a continuation of application No. 10/102,986, filed on Mar. 21, 2002, now Pat. No. 7,292,680.

(51) Int. Cl.
*H04M 1/64* (2006.01)
*H04M 3/493* (2006.01)
*G06Q 20/40* (2012.01)
*H04M 3/38* (2006.01)

(52) U.S. Cl.
CPC ............. *H04M 3/493* (2013.01); *G06Q 20/401* (2013.01); *H04M 3/382* (2013.01)

(58) Field of Classification Search
CPC ............. H04M 2203/6009; H04M 2203/6045; H04M 2203/6054; H04M 2203/6072
USPC ............... 379/88.02, 88.18, 201.02; 713/186; 705/14.69
See application file for complete search history.

(56) References Cited

U.S. PATENT DOCUMENTS

| | | |
|---|---|---|
| 5,317,628 A | 5/1994 | Misholi et al. |
| 5,586,173 A | 12/1996 | Misholi et al. |
| 5,668,855 A | 9/1997 | Misholi et al. |
| 5,774,525 A | 6/1998 | Kanevsky et al. |
| 5,819,029 A | 10/1998 | Edwards et al. |
| 5,897,616 A | 4/1999 | Kanevsky et al. |
| 5,909,483 A | 6/1999 | Weare et al. |
| 5,991,882 A * | 11/1999 | O'Connell ............ G06F 21/31 726/18 |
| 6,006,257 A | 12/1999 | Slezak |
| 6,181,780 B1 | 1/2001 | Finnigan |
| 6,233,318 B1 | 5/2001 | Picard et al. |
| 6,301,349 B1 | 10/2001 | Malik |

(Continued)

OTHER PUBLICATIONS

Toshiba; Strategy ES Enterprise Server, Release 2; Mar. 2000, pp. 1-78.

(Continued)

*Primary Examiner* — Van D Huynh
(74) *Attorney, Agent, or Firm* — Myers Bigel & Sibley, P.A.

(57) ABSTRACT

The preferred embodiments of the present invention include providing automated passcode recovery in an interactive voice response system by providing to a caller an automated passcode recovery question and processing a caller answer to the automated passcode recovery question to authenticate the caller.

9 Claims, 17 Drawing Sheets

(56) References Cited

U.S. PATENT DOCUMENTS

| | | | |
|---|---|---|---|
| 6,330,308 | B1 | 12/2001 | Cheston, III et al. |
| 6,356,868 | B1 | 3/2002 | Yuschik et al. |
| 6,360,322 | B1 | 3/2002 | Grawrock |
| 6,438,601 | B1 | 8/2002 | Hardy |
| 6,456,699 | B1 | 9/2002 | Burg et al. |
| 6,594,347 | B1 | 7/2003 | Calder et al. |
| 6,600,736 | B1 | 7/2003 | Ball et al. |
| 6,671,672 | B1 * | 12/2003 | Heck ............ G10L 17/24 704/273 |
| 6,734,886 | B1 | 5/2004 | Hagan et al. |
| 6,973,575 | B2 * | 12/2005 | Arnold ............ G06F 21/32 713/168 |
| 7,035,384 | B1 | 4/2006 | Scherer |
| 7,240,037 | B1 | 7/2007 | Bussell |
| 7,251,632 | B1 | 7/2007 | Ogg et al. |
| 7,292,680 | B1 | 11/2007 | Simpson |
| 7,580,937 | B2 | 8/2009 | Kalmick et al. |
| 2001/0047347 | A1 | 11/2001 | Perell et al. |
| 2002/0111809 | A1 | 8/2002 | McIntosh |
| 2003/0048890 | A1 | 3/2003 | Weiss et al. ............ 379/201.02 |
| 2004/0078775 | A1 | 4/2004 | Chow et al. |
| 2007/0073551 | A1 | 3/2007 | Williams et al. |
| 2012/0191549 | A1 * | 7/2012 | Winarski ............ G06Q 30/02 705/14.69 |

OTHER PUBLICATIONS

Simpson, Non-Final Office Action mailed Apr. 22, 2004, filing date Mar. 21, 2002, U.S. Appl. No. 10/102,986.
Simpson, Non-Final Office Action mailed Dec. 17, 2004, filing date Mar. 21, 2002, U.S. Appl. No. 10/102,986.
Simpson, Non-Final Office Action mailed Jul. 28, 2005, filing date Mar. 21, 2002, U.S. Appl. No. 10/102,986.
Simpson, Non-Final Office Action mailed Jan. 3, 2006, filing date Mar. 21, 2002, U.S. Appl. No. 10/102,986.
Simpson, Non-Final Office Action mailed Jun. 8, 2006, filing date Mar. 21, 2002, U.S. Appl. No. 10/102,986.
Simpson, Non-Final Office Action mailed Nov. 24, 2006, filing date Mar. 21, 2002, U.S. Appl. No. 10/102,986.
Simpson, Final Office Action mailed Mar. 30, 2007, filing date Mar. 21, 2002, U.S. Appl. No. 10/102,986.
Simpson, Notice of Allowance and Fees mailed Jul. 11, 2007, filing date Mar. 21, 2002, U.S. Appl. No. 10/102,986.

* cited by examiner

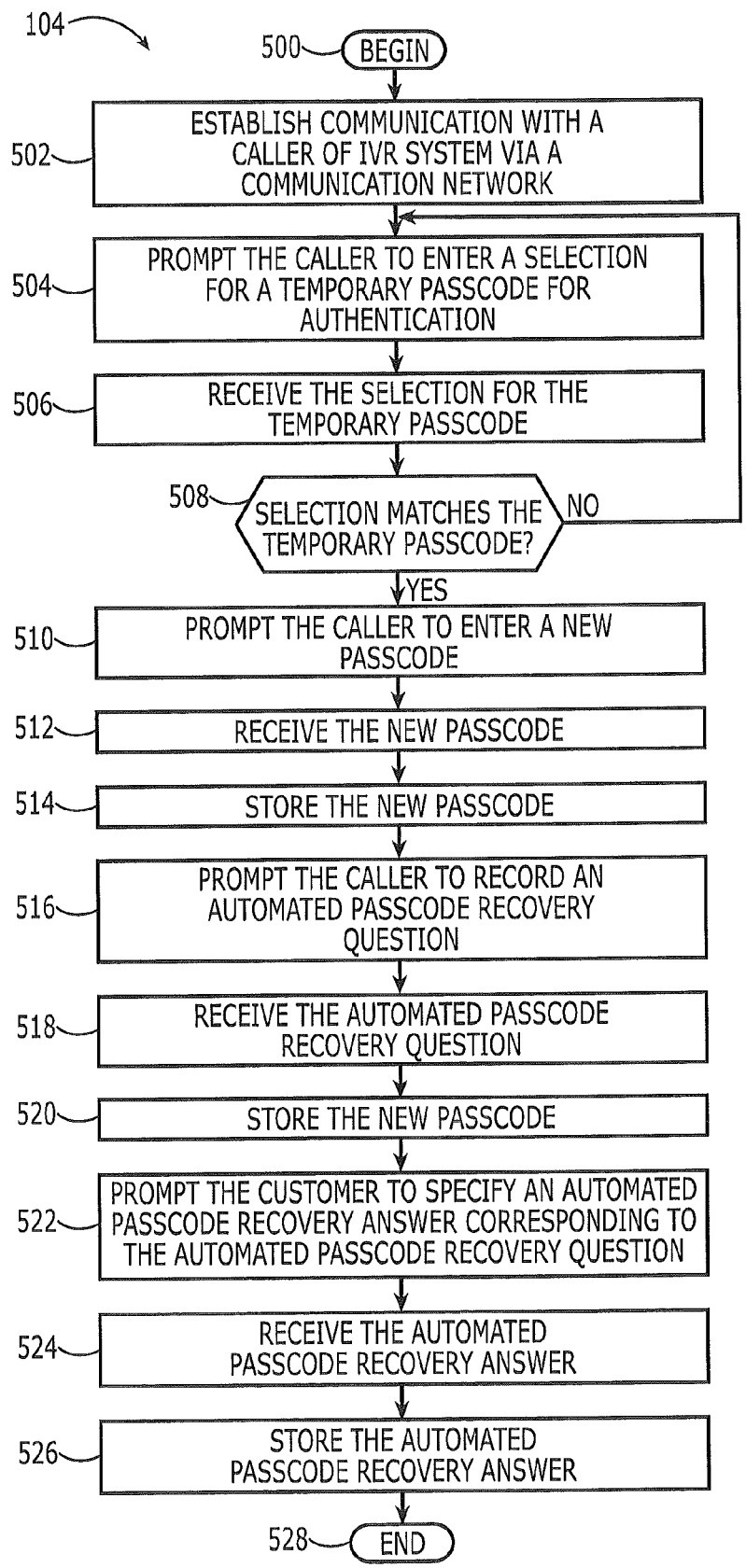

AUTOMATED PASSCODE RECOVERY IN AN INTERACTIVE VOICE RESPONSE SYSTEM

CROSS-REFERENCE TO RELATED APPLICATION

This application is a continuation of U.S. Utility Application entitled, "Automated Passcode Recovery in an Interactive Voice Response System," having Ser. No. 12/776,943, which was filed on May 10, 2010, which is a continuation of U.S. Utility Application entitled, "Automated Passcode Recovery in an Interactive Voice Response System," having Ser. No. 11/923,939, which was filed on Oct. 25, 2007 (now U.S. Pat. No. 7,715,532), which is a continuation of U.S. Utility Application entitled, "Automated Passcode Recovery in an Interactive Voice Response System," having Ser. No. 10/102,986, which was filed on Mar. 21, 2002 (now U.S. Pat. No. 7,292,680), the entire contents of which are hereby incorporated herein by reference.

TECHNICAL FIELD

The present invention is generally related to interactive voice response systems and, more particularly, is related to passcodes in an interactive voice response system.

BACKGROUND OF THE INVENTION

Interactive voice response systems are commonly used as interfaces at a wide variety of support centers, call centers, and other information retrieval centers (e.g., voice mail systems, automated banking systems, etc.). When an interactive voice response system is contacted by a caller, the caller is typically first presented with voice information from an interactive voice response unit. The interactive voice response unit poses voice queries to the caller. The caller inputs responses (e.g., with a touch tone telephone and dual tone multifrequency (DTMF) tones) to the voice queries, and then is presented additional voice queries based on the responses. The caller responses to the voice queries are typically used to route the caller to a desired destination, dispense information for the caller, and/or collect information from the caller.

Typically, interactive voice response systems also employ an authentication function whereby a caller must enter an authentication passcode, password, personal identification number (PIN), etc. before the caller can be authenticated to use the interactive voice response system. For example, when the caller first contacts the interactive voice response system, the caller may be required to input the special passcode before the caller is able to gain full access to the services provided by the interactive voice response system. However, such systems may be problematic in situations where the caller cannot recall the authentication passcode. For example, in existing systems, if the caller forgets the authentication passcode, the only means by which the user can retrieve the authentication passcode is to contact a customer service representative associated with the service provider that supports the interactive voice response system. Typically, the customer service representative will establish a temporary passcode, which the caller may use to access the interactive voice response system. After gaining access to the interactive voice response system, the caller may then change the passcode.

This method for recovering passcodes may be very expensive for the service provider because of the need to maintain a customer service presence to respond to these situations. Furthermore, this recovery method may serve as a deterrent to callers who frequently forget their passcode because the caller would have to contact the customer service representative each time the passcode is forgotten.

Thus, there is a need in the industry for systems and methods for addressing these and/other problems.

SUMMARY OF THE INVENTION

The preferred embodiments of the present invention include providing automated passcode recovery in an interactive voice response system by providing to a caller an automated passcode recovery question and processing a caller answer to the automated passcode recovery question to authenticate the caller.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

The preferred embodiments of the present invention can be better understood with reference to the following drawings. The components in the drawings are not necessarily to scale, emphasis instead being placed upon clearly illustrating the principles of the preferred embodiments of the present invention. Moreover, in the drawings, like reference numerals designate corresponding parts throughout the several views.

FIG. 5 is a flow chart illustrating the architecture, functionality, and/or operation of one preferred embodiment of the automated passcode recovery system of FIGS. 1 and 4.

DETAILED DESCRIPTION OF THE PREFERRED EMBODIMENT

I. System Overview

Figure 1:
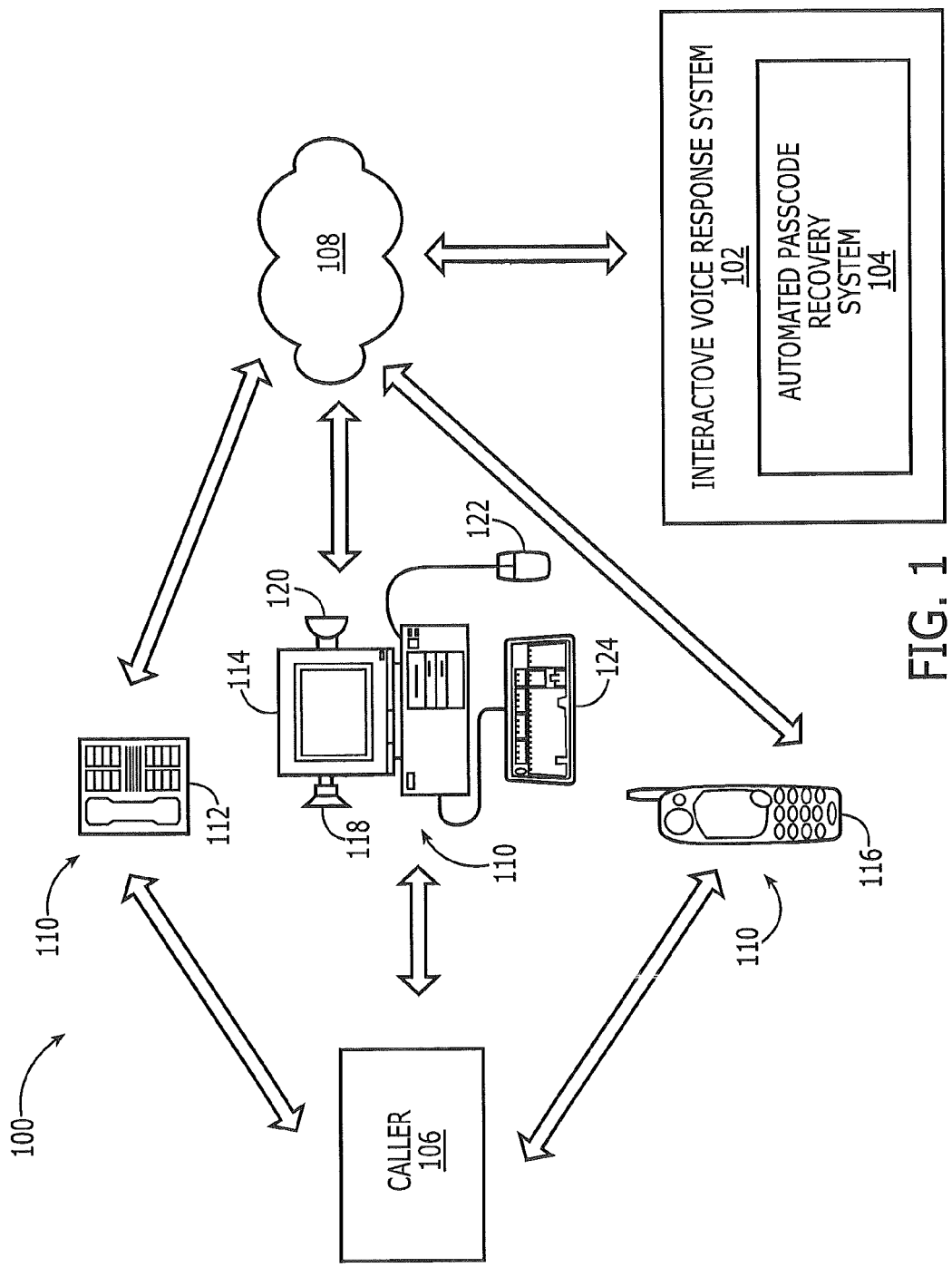
FIG. 1 is a block diagram of a system according to one preferred embodiment of the present invention, in which an automated passcode recovery system may be implemented.

FIG. 1 illustrates one of many possible preferred embodiments of a system 100 in which an automated passcode recovery system 104 may be implemented. As illustrated in FIG. 1, system 100 comprises automated passcode recovery system 104 integrated with an interactive voice response system 102, one or more communication devices 110, and a communication network 108. The architecture, operation, and functionality of automated passcode recovery system 104 is described in more detail below. However, by way of introduction, the general architecture, operation, and functionality of automated passcode recovery system 104 will be discussed briefly.

In operation, a caller 106 may use a communication device 110 to access interactive voice response system 102 via communication network 108 and receive any of a variety of types of services provided by interactive voice response system 102. Interactive voice response system 102 may be configured such that, in order to be authenticated (i.e., gain access to the services provided by interactive voice response system 102 and/or access caller information stored in interactive voice response system 102), a caller 106 must first enter an authentication passcode, password, personal identification number (PIN), etc. corresponding to the caller 106. In certain embodiments, a caller 106 may enter the authentication passcode via a touch tone keypad using dual tone multifrequency (DTMF) tones. If the proper authentication passcode is entered the caller 106 is authenticated. However, if the incorrect authentication passcode is entered, the caller 106 is not authenticated. Therefore, if the caller 106 has forgotten the corresponding authentication passcode, in existing systems, the caller 106 may not be able to access interactive voice response system 102.

Automated passcode recovery system 104 provides a means by which the caller 106 may recover the authentication passcode from, and gain access to, interactive voice response system 102 even in situations in which the caller 106 cannot recall the original authentication passcode. In this regard, interactive voice response system 102 may store an automated passcode recovery question and a corresponding automated passcode recovery answer. For instance, a caller 106 may record a particular question to which only the caller 106 is likely to know the appropriate answer. By way of example, the automated passcode recovery question may comprise the question "What is your mother's maiden name?" or "What is your driver's license number?" (Therefore, relatives cannot easily guess the automated passcode recovery answer). Therefore, in the event that the caller 106 has forgotten the original authentication passcode, interactive voice response system 102 may play the automated passcode recovery question to the caller 106 using a conventional speaker integrated with communication device 110. In certain embodiments, the automated passcode recovery question may be recorded and played back to the caller 106 in the caller's voice. In this manner, the caller 106 may more easily determine the automated passcode recovery question. If the caller 106 enters, (e.g., via dual tone multifrequency (DTMF) tones on communication device 110) the appropriate answer to the question, interactive voice response system 102 may authenticate the caller 106 and/or provide the caller 106 with the original authentication passcode. In other words, automated passcode recovery system 104 provides an additional level of security for customers that have forgotten the original authentication passcode.

Referring again to FIG. 1 and the components of system 100, one of ordinary skill in the art will appreciate that communication network 108 may comprise any communication network, such as a public or private packet-switched or other data network including the Internet, a circuit switched network, such as the public switched telephone network (PSTN), a wireless network that provides any type of wireless service (e.g., advanced mobile telephone services (AMPS), digital AMPS (D-AMPS), personal communication services (PCS), global system for mobile communications (GSM), specialized mobile radio (SMR), cellular digital packet data (CDPD), etc.), an optical network, or any other desired communications infrastructure regardless of the underlying transmission media, network topology, communication protocols, etc.

Communication devices 110 may comprise any device configured for communication with communication network 108 and configured to communicate with interactive voice response system 102. By way of example, as illustrated in FIG. 1, communication devices 110 may comprise a telephone 112 or a wireless telephone 116, such as a cell phone. In other embodiments, communication device 110 may comprise a computer 114 (e.g., a personal computer, workstation, laptop computer, etc.) configured with a microphone 120 and a speaker 118 for voice communication. Computer 114 may further comprise a mouse 122 and a keyboard 124.

As known in the art, interactive voice response system 102 refers to a system configured to enable a caller to interact with caller information stored in memory (e.g., a database) based on a telephony technology in which the caller uses a DTMF telephone, or similar device, to interact with the database. Interactive voice response (IVR) technology does not require human interaction over the telephone because the caller's interaction with the database is predetermined by what the IVR system will allow the caller to access. For example, banks and credit card companies may use IVR systems so that their customers can receive up-to-date account information instantly and easily without having to speak directly to a person. IVR technology is also used to gather information, as in the case of telephone surveys in which the caller is prompted to answer questions by pushing the number buttons on a touch-tone telephone. One of ordinary skill in the art will appreciate that, based on the particular configuration of the voice prompts, etc., interactive voice response system 102 may be configured to provide any of a variety of types of services. For example, interactive voice response system 102 may be configured to provide automated banking services, automated customer transactions, voice mail services, etc.

Figure 2A:
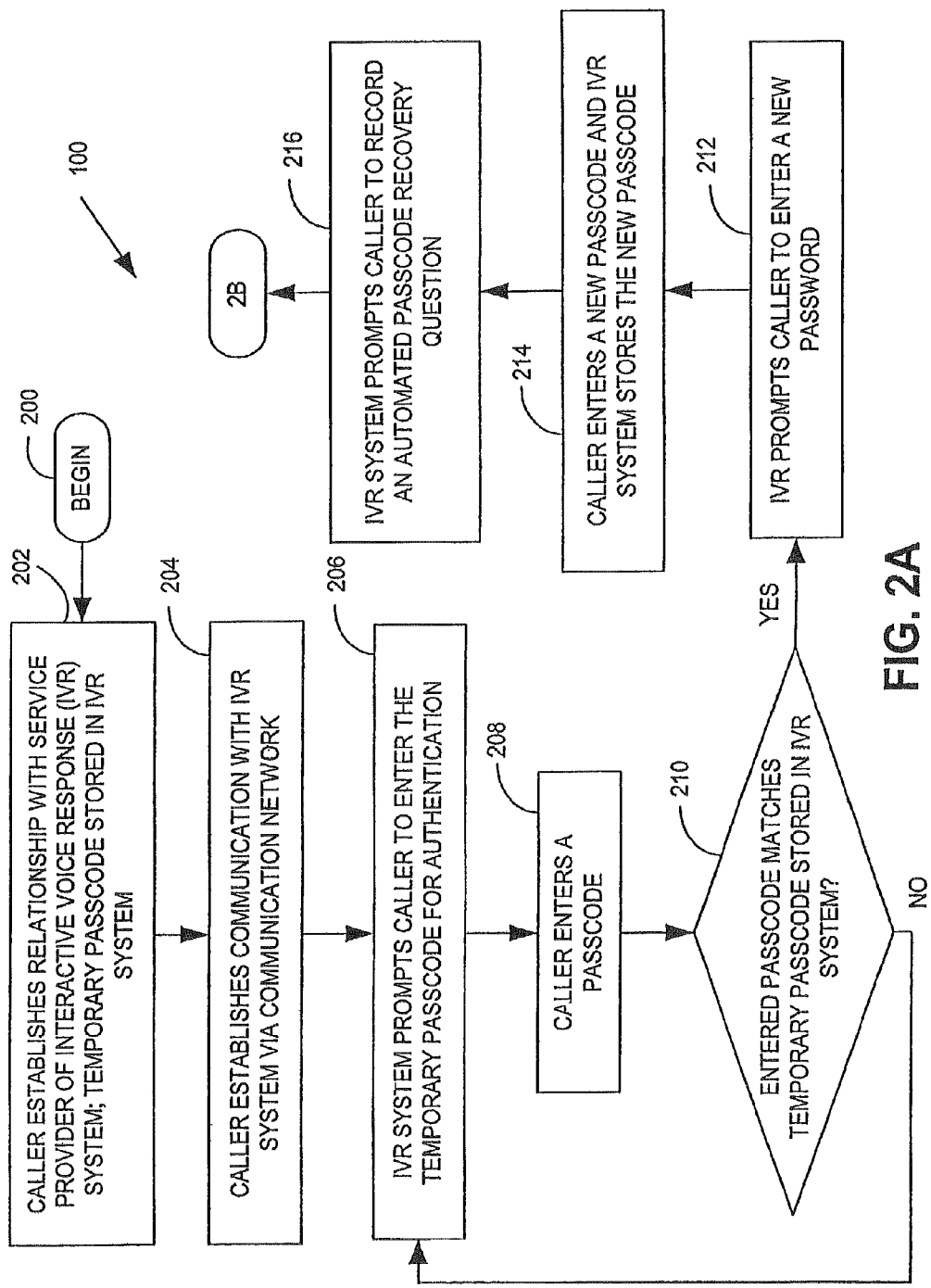
FIG. 2A is a first portion of a flow chart illustrating the general operation of the system of FIG. 1 during a customization process.
Figure 2B:
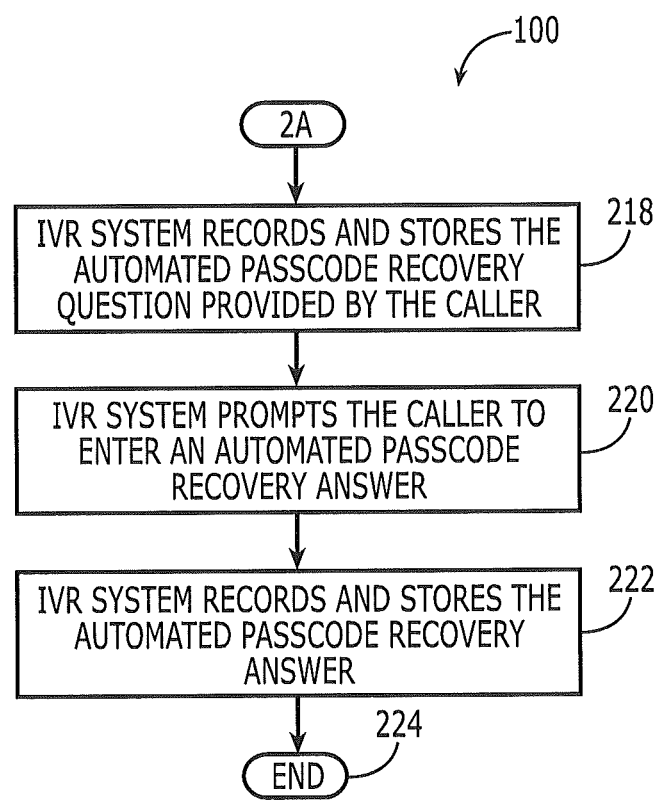
FIG. 2B is a second portion of the flow chart of FIG. 2A.

Referring to FIGS. 2A, 2B, 3A, and 3B, the general operation of system 100 will be described. FIGS. 2A and 2B represent a flow chart illustrating the general operation of system 100 during a customization process according to preferred embodiments of the present invention. After beginning at block 200, at block 202, a caller 106 may establish a relationship with a service provider that supports interactive voice response system 102, at which point a temporary passcode corresponding to the caller 106 may be generated and stored in interactive voice response system 102. This process may take place over the telephone, via the Internet, or face-to-face with a representative of the service provider. At block 204, the caller 106 may establish an initial communication with interactive voice response system 102 via communication network 108. At block 206, interactive voice response system 102 prompts the caller 106 to enter the temporary passcode in order to be authenticated. At block 208, the caller 106 enters a passcode. As stated above, the caller may enter the passcode using dual tone multifrequency (DTMF) tones. In alternative embodiments, such as where interactive voice response system 102 employs speech recognition technology, the caller 106 may enter the passcode by speaking.

At decision block 210, interactive voice response system 102 determines whether the passcode entered by the caller 106 matches the temporary passcode corresponding to the caller 106, which is stored in the database. If the entered passcode does not match the proper temporary passcode, block 206 may be repeated. If the entered passcode does match the proper temporary passcode, at block 212, interactive voice response system 102 prompts the caller 106 to enter a new authentication passcode. At block 214, the caller 106 may enter a new authentication passcode in the manner described above. Interactive voice response system 102 may then store the new authentication passcode.

At block 216, interaction voice response system 102 may then prompt the caller 106 to record an automated passcode recovery question if desired by the caller 106. At block 218, interactive voice response system 102 records and stores the automated passcode recovery question provided by the caller 106. One of ordinary skill in the art will appreciate that the automated passcode recovery question may be recorded as the caller 106 speaks. In alternative embodiments, the automated passcode recovery question may be entered and recorded using touch tone keys, dual tone multifrequency (DTMF) tones, etc. As mentioned above, the automated passcode recovery question may comprise any question to which only the caller 106 is likely to know the answer. For instance, the automated passcode recovery question may comprise any of the following typical questions used for security and/or authentication purposes, among others: "What is your grandmother's maiden name?"; "What are the last four digits of your social security number?"; "What is your childhood pet's name?"; etc. At block 220, interactive voice response system 102 prompts the customer to enter an automated passcode recovery answer that corresponds to the automated passcode recovery question previously entered by the caller 106. Again, the automated passcode recovery answer may be entered as the caller 106 speaks (and optionally subsequently converted into data), or may alternatively be entered using touch tone keys, dual tone multifrequency (DTMF) keys, etc. At block 222, interactive voice response system 102 records and stores the automated passcode recovery answer.

Figure 3A:
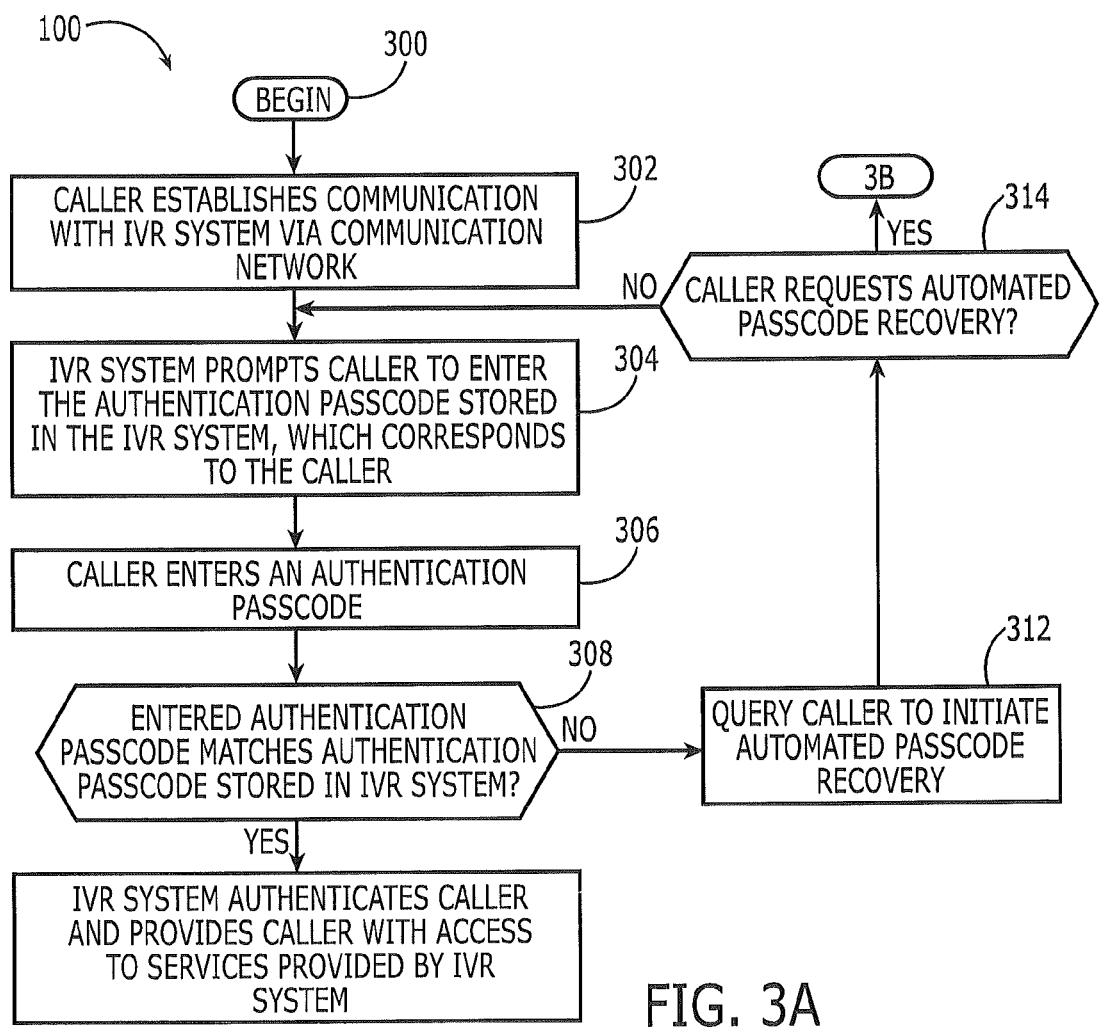
FIG. 3A is a first portion of a flow chart illustrating the general operation of the system of FIG. 1 during a passcode recovery.
Figure 3B:
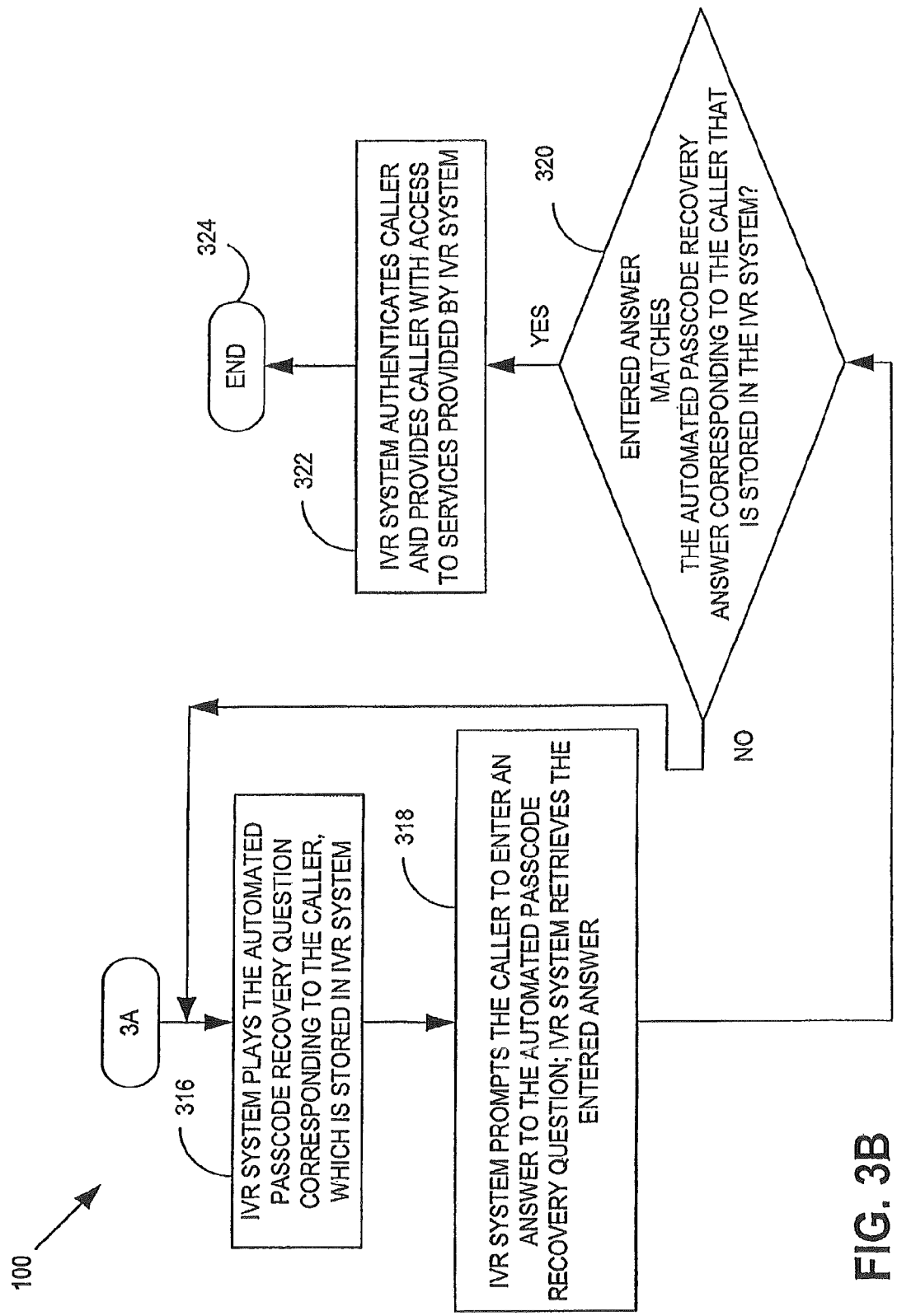
FIG. 3B is a second portion of the flow chart of FIG. 3A.

It will be appreciated with reference to the passcode recovery process illustrated in FIGS. 3A and 3B, that specifying/customizing an automated passcode recovery question and a corresponding automated passcode recovery answer provides a means by which the caller 106 may recover an authentication passcode that has been forgotten. FIGS. 3A and 3B represent a flow chart illustrating the general operation of the system 100 during a passcode recovery process according to the present invention. At block 302, a caller 106 may establish communication with interactive voice response system 102, via communication network 108, using a communication device 110 (e.g., a telephone 112, a wireless telephone 116, a computer 114, etc.). At block 304, interactive voice response system 102 may prompt the caller 106 to enter the authentication passcode corresponding to the caller. As stated above, the authentication passcode and other caller information may be stored in interactive voice response system 102. Furthermore, the authentication passcode may comprise the temporary passcode created at the conception of the relationship between the caller 106 and the service provider or the passcode specified by the caller 106 during the customization process described above. At block 306, the caller 106 enters an authentication password in the manner described above.

At decision block 308, interactive voice response system 102 determines whether the entered passcode matches the authentication passcode stored in interactive voice response system 102. If the entered passcode does match the stored authentication passcode, at block 310, interactive voice response system 102 may authenticate the caller 106 and/or provide the caller 106 with access to additional services provided by interactive voice response system 102. If the entered passcode does not match the stored authentication passcode, at block 312, interactive voice response system 102 may query the caller 106 to initiate an automated passcode recovery process. One of ordinary skill in the art will appreciate that system 100 may be configured such that the automated passcode recovery process is automatically initiated after the caller 106 has entered an improper passcode some predetermined number of times. For example, the caller 106 may be prompted to re-enter a passcode in situations where the initial attempt did not provide a match. This process may be repeated a predetermined number of times.

As illustrated by decision block 314, if the automated passcode recovery process is initiated (e.g., automatically initiated, initiated by the caller 106, etc.), at block 316, interactive voice response system 102 may play the automated passcode recovery question corresponding to the current caller 106. At block 318, interactive voice response system 102 may prompt the caller 106 to enter an answer to the automated passcode recovery question. After retrieving the entered answer, at decision block 320, interactive voice response system 102 determines whether the entered answer matches the automated passcode recovery answer corresponding to the caller 106 and which is stored in interactive voice response system 102. If the entered answer does not match the automated passcode recovery answer, the process may be repeated at block 316. However, if the entered answer does match the stored answer corresponding to the caller 106, at block 322, interactive voice response system 102 may provide the authentication passcode to the caller. In this manner, the caller 106 may be subsequently authenticated when the proper authentication passcode is entered. In alternative embodiments, interactive voice response system 102 may automatically authenticate the caller 106 when the proper automated passcode recovery answer is entered.

II. Interactive Voice Response System

Figure 4:
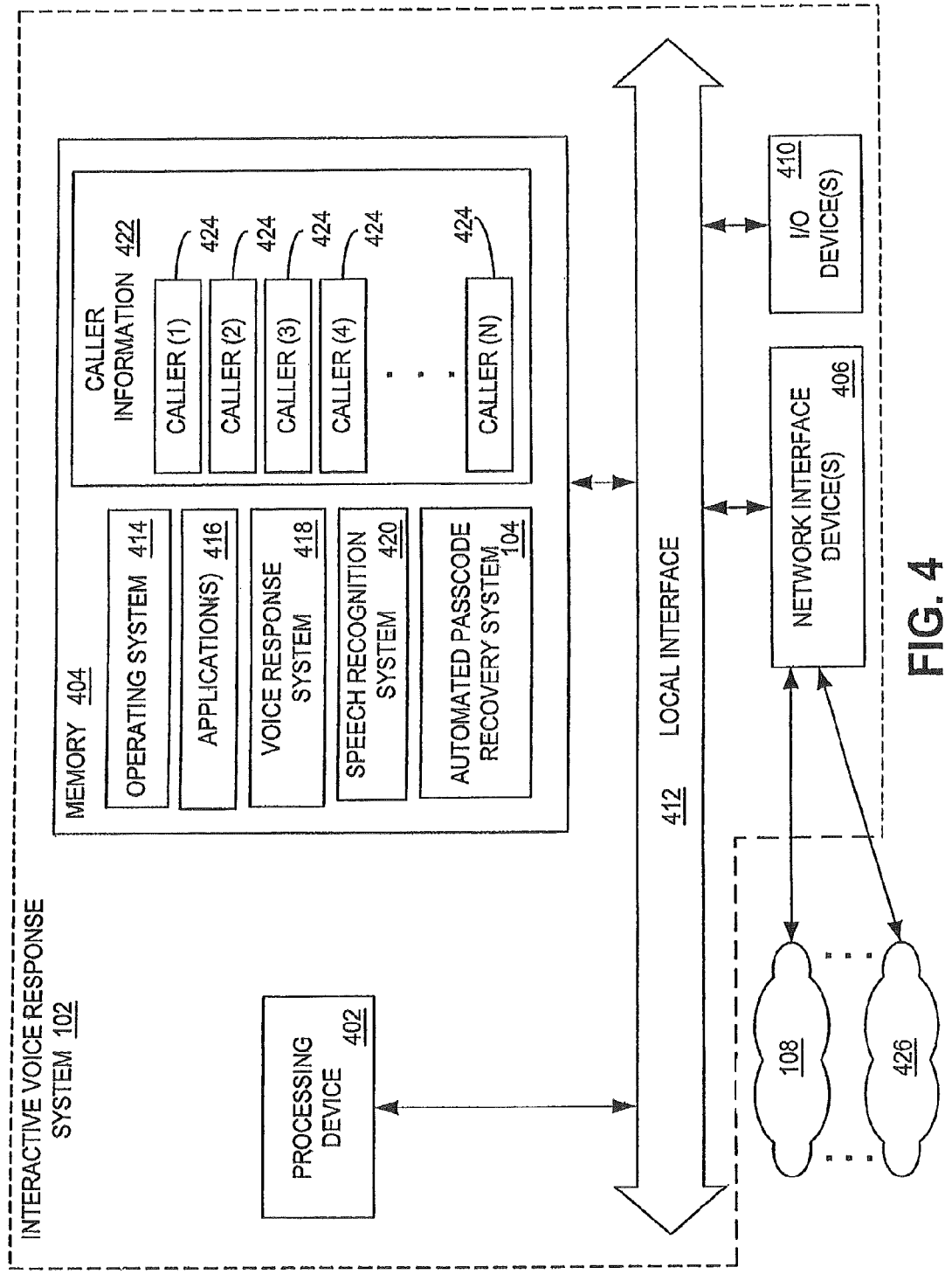
FIG. 4 is a block diagram illustrating an embodiment of the interactive voice response system of FIG. 1.

FIG. 4 is a block diagram illustrating one preferred embodiment of interactive voice response system 102. As illustrated in FIG. 4, interactive voice response system 102 includes automated passcode recovery system 104. Automated passcode recovery system 104 may be implemented in software, firmware, hardware, or a combination thereof. In the preferred embodiment illustrated in FIG. 4, automated passcode recovery system 104 is implemented in software, as an executable program, which is executed by a processing device 402. Generally, in terms of hardware architecture, as shown in FIG. 4, interactive voice response system 102 comprises a processing device 402, memory 404, one or more network interface devices 406, and one or more input and/or output (I/O) devices 410 interconnected via a local interface 412. Interactive voice response system 102 may further comprise additional components not illustrated in FIG. 4.

Referring again to FIG. 4, the various components of interactive voice response system 102 will be described. Local interface 412 may be, for example but not limited to, one or more buses or other wired or wireless connections. The local interface 412 may have additional elements, which are omitted for simplicity, such as controllers, buffers (caches), drivers, repeaters, and receivers, to enable communications. Furthermore, the local interface 412 may include address, control, and/or data connections to enable appropriate communications among the aforementioned components.

Processing device 402 is a hardware device for executing software, particularly that stored in memory 404. Processing device 402 may be any custom-made or commercially-available processor, a central processing unit (CPU), an auxiliary processor among several processors associated with interactive voice response system 102, a semiconductor based microprocessor (in the form of a microchip or chip set), a macroprocessor, or generally any device for executing software instructions.

As illustrated in FIG. 4, memory 404 may comprise an operating system 414, one or more applications 416, a voice response system 418, a speech recognition system 420, automated passcode recovery system 104, and caller information 422, which includes portions 424 corresponding to each caller 106. The architecture, operation, and/or functionality of automated passcode recovery system 104 will be described in detail below. Memory 404 may include any one or combination of volatile memory elements (e.g., random access memory (RAM, such as DRAM, SRAM, SDRAM, etc.)) and nonvolatile memory elements (e.g., ROM, hard drive, tape, CDROM, etc.). Memory 404 may incorporate electronic, magnetic, optical, and/or other types of storage media. Furthermore, memory 404 may have a distributed architecture, in which various components are situated remote from one another, but can be accessed by processing device 402. One of ordinary skill in the art will further appreciate that, in certain embodiments, caller information 422 may be stored in a database (not shown).

The software in memory 404 may include one or more separate programs, each of which comprises executable instructions for implementing logical functions. In the example of FIG. 4, the software in memory 404 includes voice response system 418, speech recognition system 420, and automated passcode recovery system 104. Memory 404 may further comprise a suitable operating system 414 that controls the execution of other computer programs, such as applications 416 and automated passcode recovery system 104, and provides scheduling, input-output control, file and data management, memory management, and communication control and related services.

Automated passcode recovery system 104, speech recognition system 420, and voice response system 418 may be a source program, executable program (object code), script, or any other entity comprising a set of instructions to be performed. When implemented as a source program, then the program needs to be translated via a compiler, assembler, interpreter, or the like, which may or may not be included within the memory 404, so as to operate properly in connection with operating system 414. Furthermore, automated passcode recovery system 104 may be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

Network interface device(s) 406 may be any device configured to facilitate communication between interactive voice response system 102 and a communication network, such as communication network 108, external communication network 426, etc. Therefore, network interface device(s) 406 may be configured to communicate with any of the following, or other, communication networks: a public or private packet-switched or other data network including the Internet, a circuit switched network, such as the public switched telephone network, a wireless network that provides any type of wireless service (e.g., advanced mobile telephone services (AMPS), digital AMPS (D-AMPS), personal communication services (PCS), global system for mobile communications (GSM), specialized mobile radio (SMR), cellular digital packet data (CDPD), etc.), an optical network, or any other desired communications infrastructure regardless of the underlying transmission media, network topology, communication protocols, etc.

Input/output devices 410 may comprise any device configured to communicate with local interface 412. One of ordinary skill in the art will appreciate that, depending on the configuration of interactive voice response system 102, input/output devices 410 may include any of the following, or other, devices: a keyboard, a mouse, display device, such a computer monitor, a serial port, a parallel port, a printer, speakers, a microphone, telephone, etc.

Voice response system 418 may comprise logic configured to control the manner in which a caller 106 interacts with interactive voice response system 102. In other words, the logic may define a voice menu system comprising a set of system voice prompts, a set of available functions, services, etc., and the available responses for each voice prompt. Thus, voice response system 418 controls the voice prompts provided to a caller 106, interprets the responses provided by the caller 106, and controls the information and/or services provided to the caller 106 based on the particular responses. By way of example, in a voice mail system, voice response system 418 may control the manner in which the caller 106 may access a voice mailbox based on a collection of voice prompts and corresponding responses.

As stated above, in certain preferred embodiments, a caller 106 may interact with interactive voice response system 102 by speaking directly into communication device 110. In these embodiments, speech recognition system 420 may be employed to recognize the spoken words, voice commands, etc. provided by the caller 106. Accordingly, speech recognition system 420 comprises logic configured to recognize and/or interpret human speech patterns.

During operation of interactive voice response system 102, the processing device 402 is configured to execute logic stored within the memory 404, to communicate data to and from the memory 404, and to generally control operations of interactive voice response system 102 pursuant to the software. Automated passcode recovery system 104, voice response system 418, speech recognition system 420, and operating system 414, in whole or in part, but typically the latter, are read by the processing device 402, perhaps buffered within the processing device 602, and then executed.

In embodiments where automated passcode recovery system 104, voice response system 418, and speech recognition system 420 are implemented in software, as is shown in FIG. 4, each software module may be stored on any computer-readable medium for use by or in connection with any computer related system or method. In the context of this document, a computer-readable medium may be an electronic, magnetic, optical, or other physical device or means that may contain or store a computer program for use by or in connection with a computer-related system or method. Automated passcode recovery system 104 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In alternative embodiments where automated passcode recovery system 104, voice response system 418, and speech recognition system 420 are implemented in hardware, the corresponding logic may be implemented with any or a combination of the following, or other, technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

III. Automated Passcode Recovery System

FIG. 5 is a flow chart illustrating the architecture, functionality, and/or operation of one preferred embodiment of automated passcode recovery system 104 during a customization process. For example, in certain preferred embodiments, this customization process may be performed upon an initial communication between the caller 106 and interactive voice response system 102. In this manner, the caller 106 may specify a particular authentication passcode recovery question and authentication passcode recovery answer to be used in the event that the caller 106 cannot recall the authentication passcode.

Automated passcode recovery system 104 begins at block 500. As mentioned above, automated passcode recovery system 104 may be initiated by another portion of logic in memory 404. For example, during standard operation, automated passcode recovery system 104 may be initiated automatically when a caller 106 first establishes communication with interactive voice response system 102. In alternative embodiments, automated passcode recovery system 104 may be initiated by the caller 106 in conjunction with voice response system 418. Regardless of the manner in which it is initiated, as shown at block 502, communication is established between the caller 106 and interactive voice response system 102.

After the automated passcode recovery process is initiated and communication is established, at block 504, automated passcode recovery system 104 may prompt the caller 106 to enter a selection for a temporary passcode for authentication. At block 506, automated passcode recovery system 104 receives the selection for the temporary passcode. At decision block 508, automated passcode recovery system 104 determines whether the selection matches the temporary passcode stored in interactive voice response system 102. If the selection is not a match, the process may be repeated at block 504. If the selection is a match, at block 510, automated passcode recovery system 104 may prompt the caller 106 to enter a new authentication passcode. At blocks 512 and 514, automated passcode recovery system 104 may receive and store the new authentication passcode corresponding to the caller 106.

It should be noted that the process of entering the temporary passcode and specifying a new authentication passcode (blocks 504-514) need not be performed. For example, interactive voice response system 102 may be configured such that the caller 106 specifies the authentication passcode when service is established. Nonetheless, even in these circumstances, it will be appreciated that interactive voice response system 102 may be configured to enable the caller 106 to change the authentication passcode, authentication passcode recovery question, authentication passcode recovery answer, and other portions of caller information 422.

As shown in blocks 516-526, automated passcode recovery system 104 enables the caller 106 to specify/customize the automated passcode recovery question and automated passcode recovery answer. For example, at block 516, automated passcode recovery system 104 may prompt the caller 106 to optionally record an automated passcode recovery question. At blocks 518 and 520, automated passcode recovery system 104 may receive and store the automated passcode recovery question specified by the caller 106. At block 522, automated passcode recovery system 104 may prompt the caller 106 to specify an automated passcode recovery answer corresponding to the selected question. As stated above, this enables the caller 106 to specify an additional level of security/authentication, in the event the caller 106 forgets the authentication passcode. At blocks 524 and 526, automated passcode recovery system 104 may receive and store the automated passcode recovery answer. The process ends at block 528.

Figure 6A:
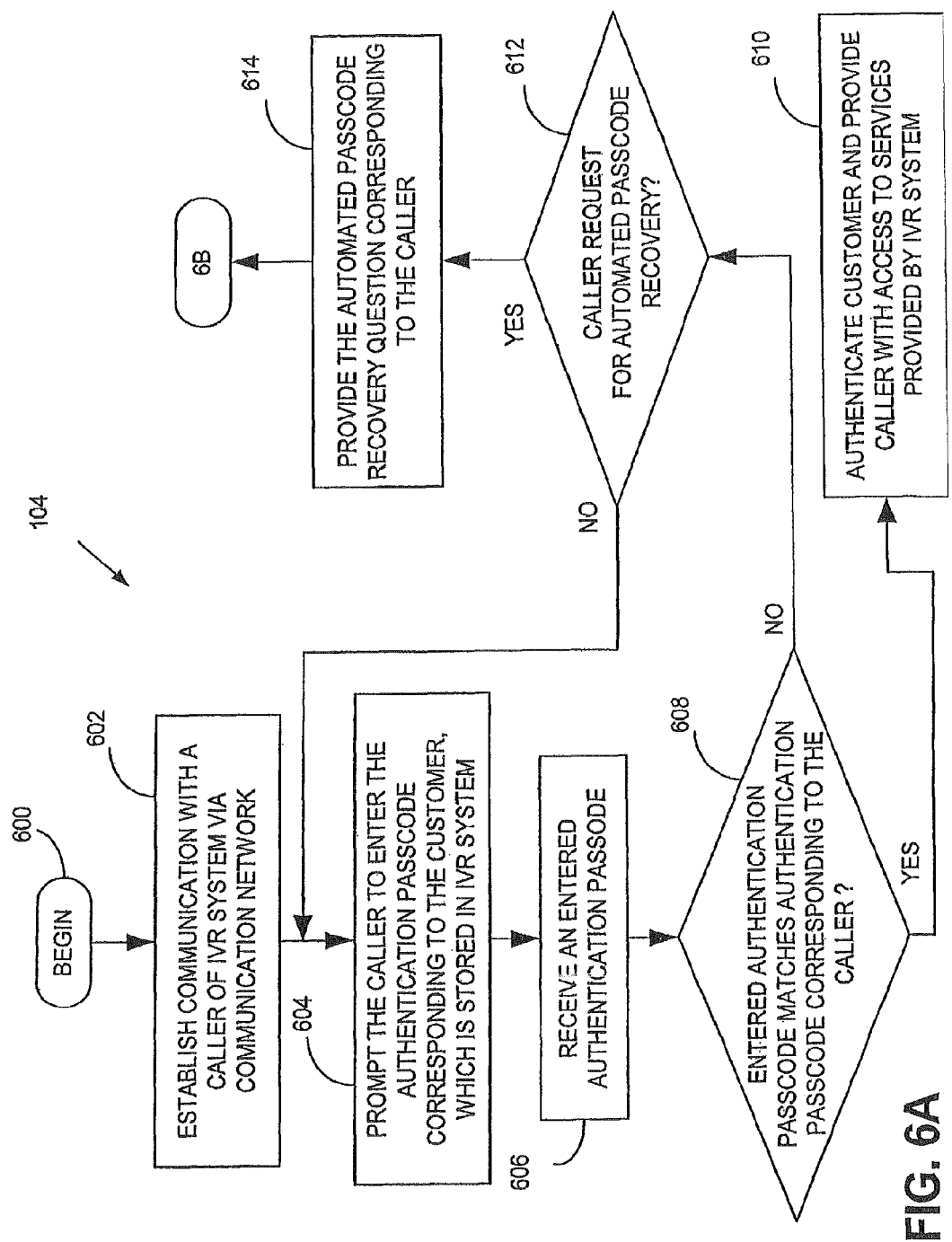
FIG. 6A is a first portion of a flow chart illustrating the architecture, functionality, and/or operation of another preferred embodiment of the automated passcode recovery system of FIGS. 1 and 4.
Figure 6B:
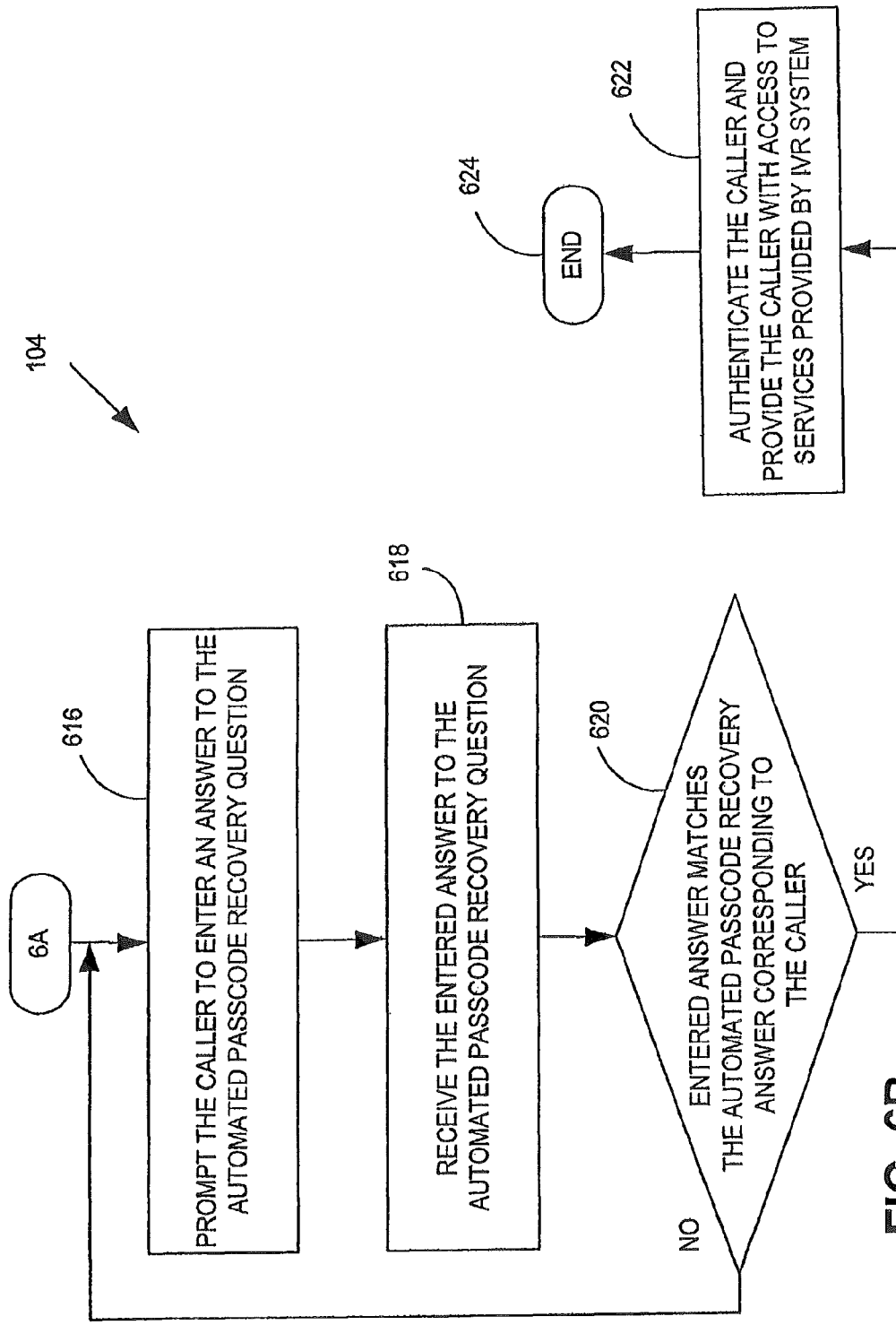
FIG. 6B is a second portion of the flow chart of FIG. 6A.

FIGS. 6A and 6B represent a flow chart illustrating the architecture, functionality, and/or operation of a preferred embodiment of automated passcode recovery system 104 during a passcode recovery process. In general, the passcode recovery process enables a caller 106, who has forgotten the assigned authentication passcode and therefore cannot be authenticated using the authentication passcode, to nonetheless be authenticated by providing the appropriate automated passcode recovery answer in response to the automated passcode recovery question.

Referring to the example of FIGS. 6A and 6B, at block 600, automated passcode recovery system 104 begins. Again, automated passcode recovery system 104 may be initiated in a number of ways. For example, in certain preferred embodiments, automated passcode recovery system 104 may be initiated by the caller 106 in response to a voice prompt provided by interactive voice response system 102. In alternative embodiments, automated passcode recovery system 104 may be initiated automatically in the event that the caller 106 enters the incorrect authentication passcode a predetermined number of times. In further embodiments, automated passcode recovery system 104 may only be initiated if caller 106 is accessing interactive voice response system 102 from a particular location, (e.g., a home phone, etc.) Regardless of the manner in which it is initiated, as shown at block 602, communication is established between the caller 106 and interactive voice response system 102.

After communication is established, at block 604, automated passcode recovery system 104 may prompt the caller 106 to enter the authentication passcode corresponding to the caller 106. At block 606, automated passcode recovery system 104 receives the entered authentication passcode. At decision block 608, automated passcode recovery system 104 determines whether the entered authentication passcode matches the authentication passcode stored in interactive voice response system 102. If there is a match, at block 610, automated passcode recovery system 104 may authenticate the caller 106 and provide the caller 106 with access to any of a variety of services provided by interactive voice response system 102. If there is not a match, at decision block 612, automated passcode recovery system 104 may determine whether the automated passcode recovery process should be initiated. It should be noted that the functionality illustrated in blocks 602-612 may reside in other portions of logic, and need not be included within automated passcode recovery system 104. In certain embodiments, automated passcode recovery system 104 may be limited to the functionality represented in block 614-622. For example, another logic module may control the customer authentication process, and only when it is determined that the passcode recovery process is to be executed, will automated passcode recovery system 104 be initiated.

Regardless of the particular embodiment, beginning at block 614, the passcode recovery process has been initiated. At block 614, automated passcode recovery system 104 provides the automated passcode recovery question corresponding to the caller 106. At block 616, automated passcode recovery system 104 may then prompt the caller 106 to enter an answer to the automated passcode recovery question. At block 618, automated passcode recovery system 104 receives the entered answer as described above. At decision block 620, automated passcode recovery system 104 determines whether the entered answer matches the automated passcode recovery answer corresponding to the caller, which is stored in interactive voice response system 102. If there is not a match, the process may be repeated at block 616. If there is a match, at block 622, automated passcode recovery system 104 may authenticate the caller 106. For example, in certain embodiments, automated passcode recovery system 104 may provide the authentication passcode to the caller. In this manner, the caller 106 may be subsequently authenticated when the proper authentication passcode is entered. In alternative embodiments, automated passcode recovery system 104 may automatically authenticate the caller 106 when the proper automated passcode recovery answer is entered. The process terminates at block 624.

IV. Voice Mail System

Figure 7:
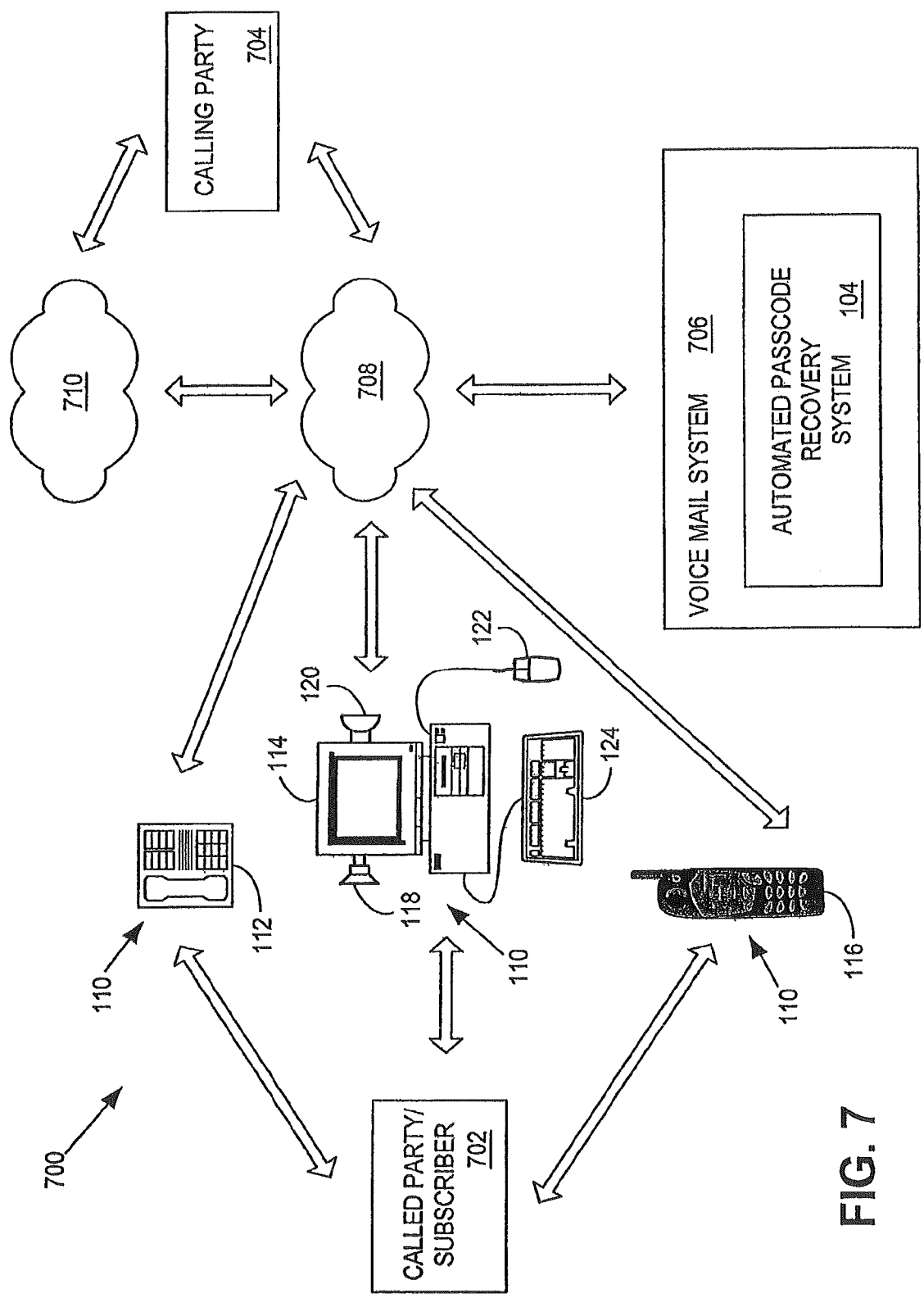
FIG. 7 is a block diagram of a system according to another preferred embodiment of the present invention, in which the automated passcode recovery system may be implemented.

FIG. 7 is a block diagram of another embodiment of a system 700 according to a preferred embodiment of the present invention, in which automated passcode recovery system 104 may be implemented. As illustrated in FIG. 7, system 700 comprises automated passcode recovery system 104 integrated with a voice mail system 706, one or more communication devices 110 (e.g., telephone 112, wireless telephone 116, computer 114, etc.), and a communication network 108. System 700 may comprise one or more subscribers 702 who have established voice mail service. In one context, a subscriber 702 may be referred to as a "called party" when a calling party 704 is attempting to call. However, in another context, when interacting with the voice mail system 706, subscriber 702 may be referred to as a "caller." As illustrated in FIG. 7, system 700 enables one or more calling parties 704 to initiate telephone calls with subscribers 702, either via the internal communication network 108 or another network 710. The calling party 704 may also be a subscriber 702. In general, system 700 enables a calling party 704, who is unable to initiate a telephone call with the called party 702, to interact with voice mail system 706 and leave a voice mail message for the called party 702. System 700 also enables the called party 702 to interact with voice mail system 706 and retrieve such voice mail messages, thus acting as a "caller" in a sense.

Figure 8A:
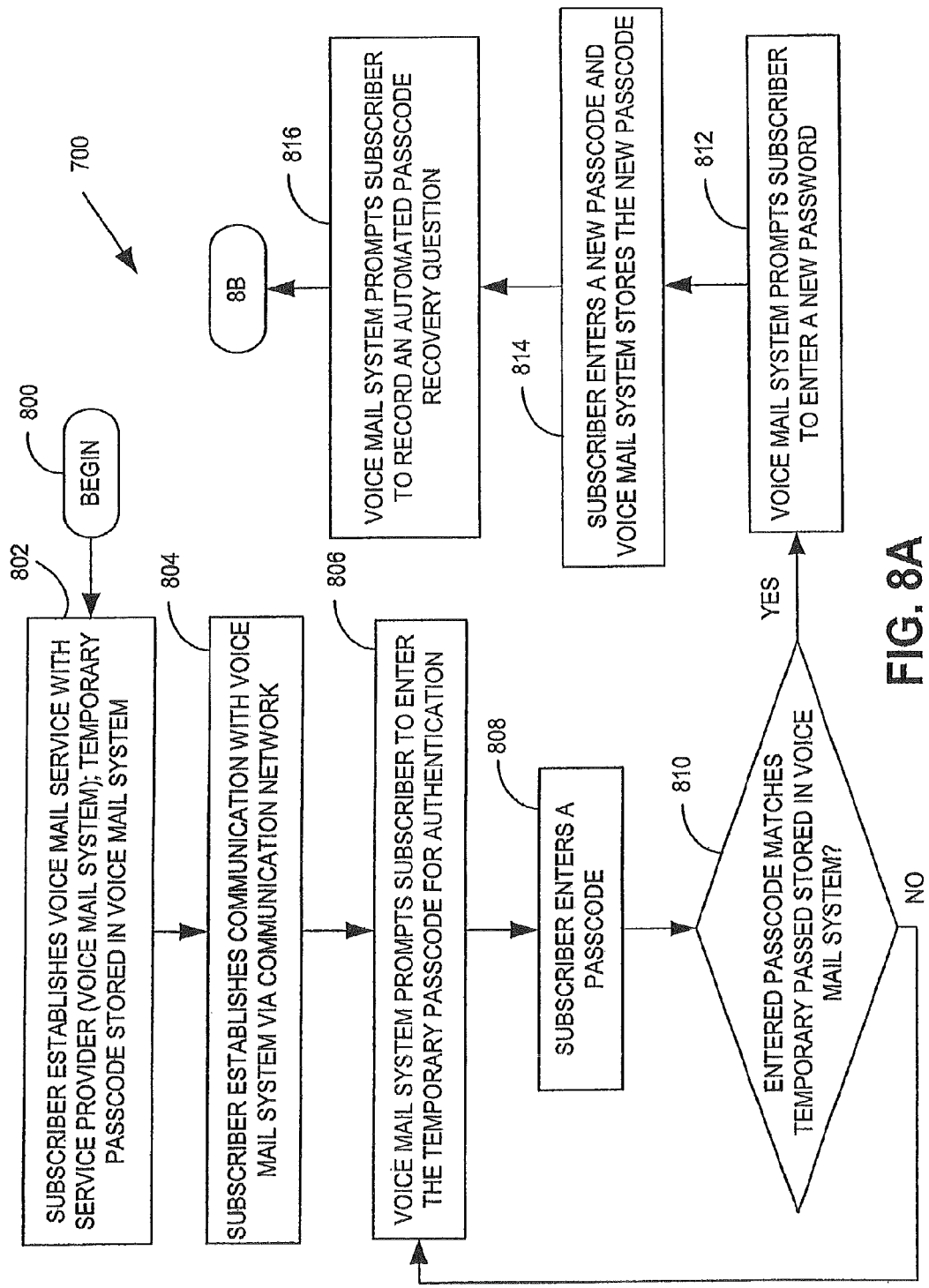
FIG. 8A is a first portion of a flow chart illustrating the general operation of the voice mail system of FIG. 7 during a customization process.
Figure 8B:
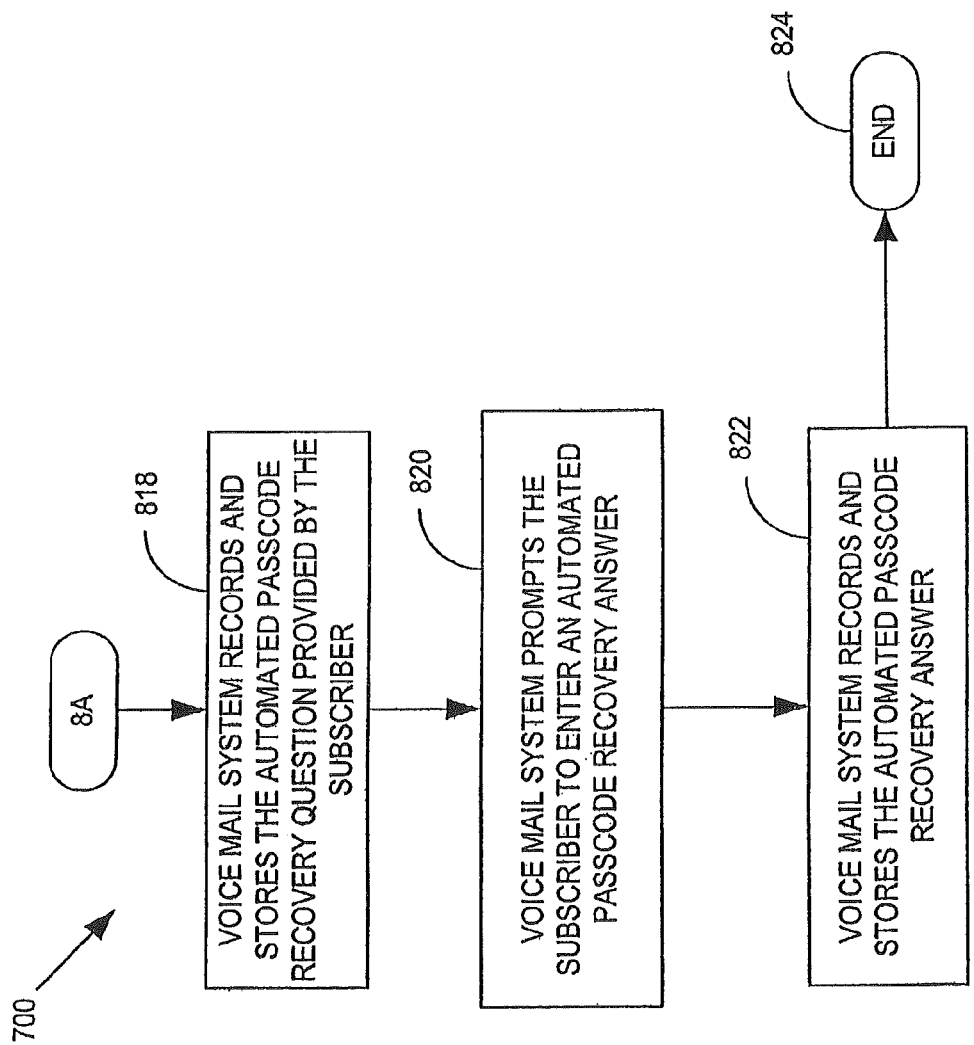
FIG. 8B is a second portion of the flow chart of FIG. 8A.

FIGS. 8A and 8B represent a flow chart illustrating the general operation of system 700 during a customization process. After beginning at block 800, at block 802, a voice mail subscriber 702 may establish voice mail service with a service provider that supports voice mail system 706. At block 804, the subscriber 702 may establish an initial communication with voice mail system 706 via communication network 708. At block 806, voice mail system 706 prompts the subscriber to enter the temporary passcode in order to be authenticated. At block 808, the subscriber 702 enters a passcode. As with system 100 described above, the subscriber 702 may enter the passcode using dual tone multifrequency (DTMF) tones. In alternative embodiments, such as where voice mail system 706 employs speech recognition technology, the subscriber 702 may enter the passcode by speaking.

At decision block 810, voice mail system 706 determines whether the passcode entered by the subscriber 702 matches the temporary passcode corresponding to the subscriber 702, which is stored in voice mail system 706. If the entered passcode does not match the proper temporary passcode, block 806 may be repeated. If the entered passcode does match the proper temporary passcode, at block 812, voice mail system 102 may prompt the subscriber 702 to enter a new authentication passcode. At block 814, the subscriber 702 may enter a new authentication passcode. Voice mail system 102 may then store the new authentication passcode.

At block 816, voice mail system 102 may then prompt the subscriber 702 to record an automated passcode recovery question. At block 818, voice mail system 706 records and stores the automated passcode recovery question provided by the subscriber 702. The automated passcode recovery question may be recorded in the manner described above with respect to system 100. At block 820, voice mail system 706 prompts the subscriber to enter an automated passcode recovery answer that corresponds to the automated passcode recovery question previously entered by the subscriber 702. At block 822, voice mail system 706 records and stores the automated passcode recovery answer.

Figure 9:
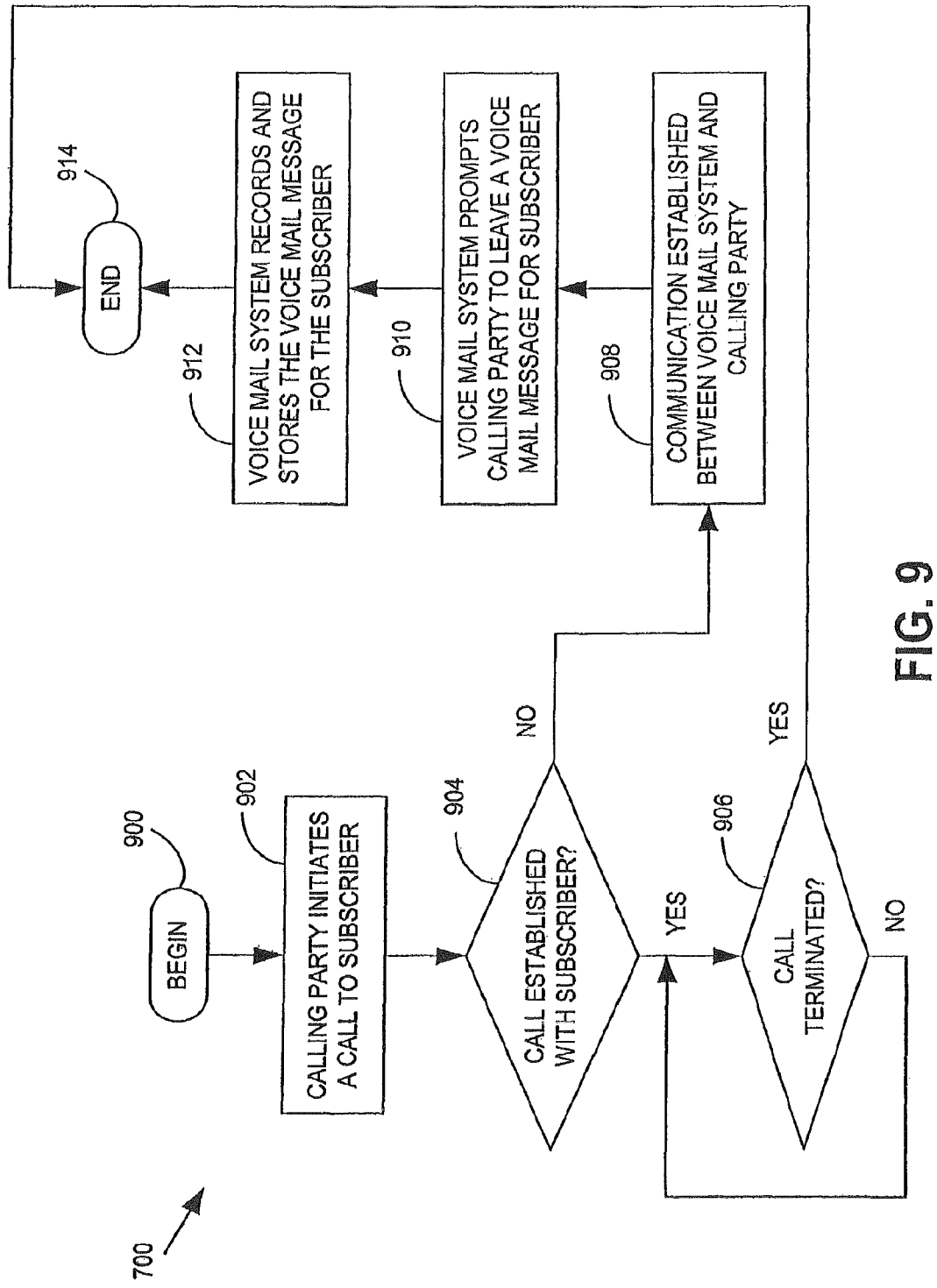
FIG. 9 is a flow chart illustrating the general operation of the voice mail system of FIG. 7, in which a calling party leaves a voice mail message for a subscriber of the voice mail system.

FIG. 9 is a flow chart illustrating the general operation of system 700, in which a calling party leaves a voice mail message for a subscriber 702 of voice mail system 706. At block 902, a calling party 704 initiates a call to a subscriber/called party 702. As shown by decision blocks 904 and 906, if a call is not established with the subscriber 702, at block 908, communication is established between the calling party 704 and voice mail system 706. At block 910, voice mail system 706 prompts the calling party 704 to leave a voice mail message for the subscriber 702. At block 912, the voice mail system 706 records and stores the voice mail message for the subscriber 702.

Figure 10A:
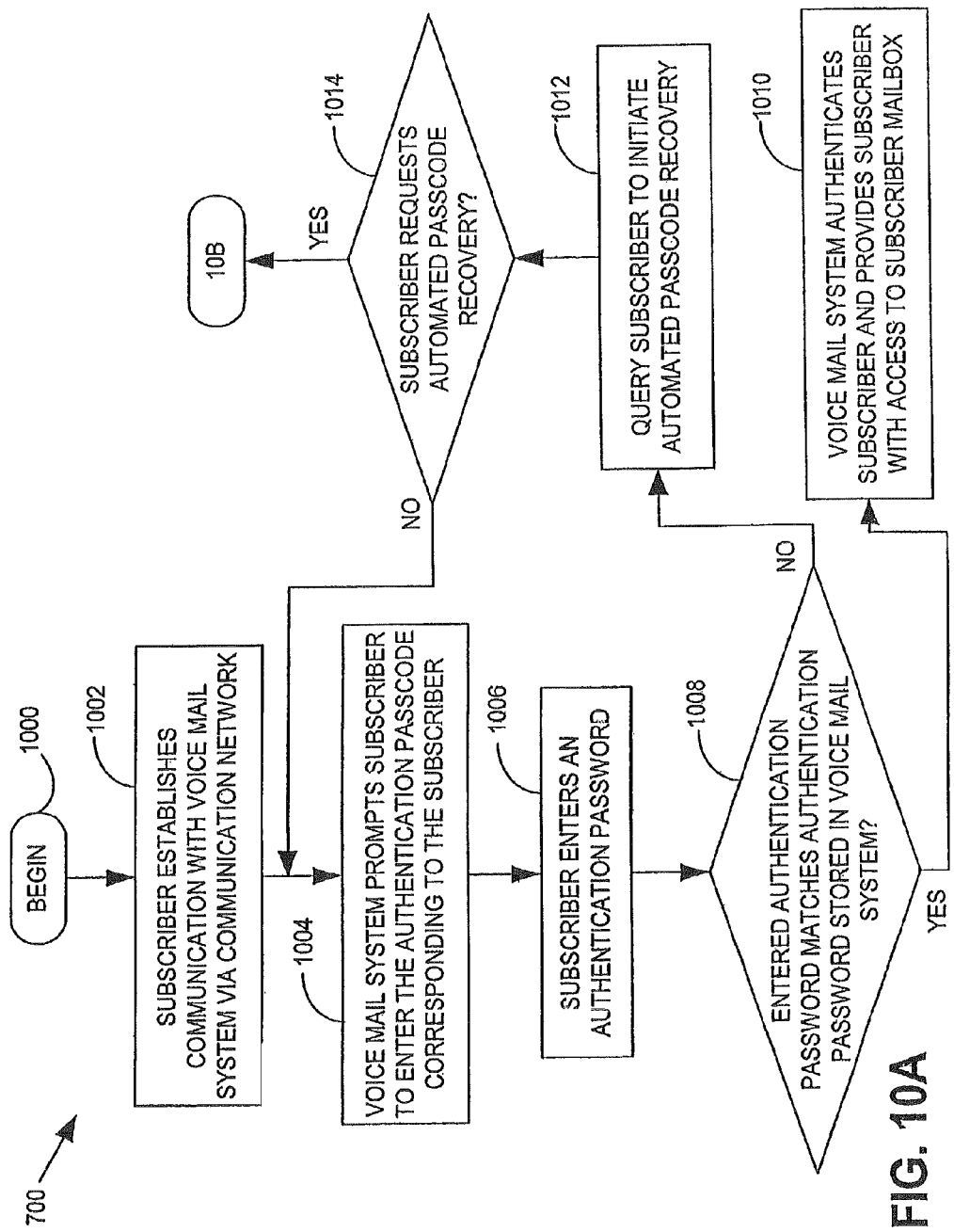
FIG. 10A is a first portion of a flow chart illustrating the general operation of the voice mail system of FIG. 7, in which the subscriber accesses the voice mail system and recovers an authentication passcode.
Figure 10B:
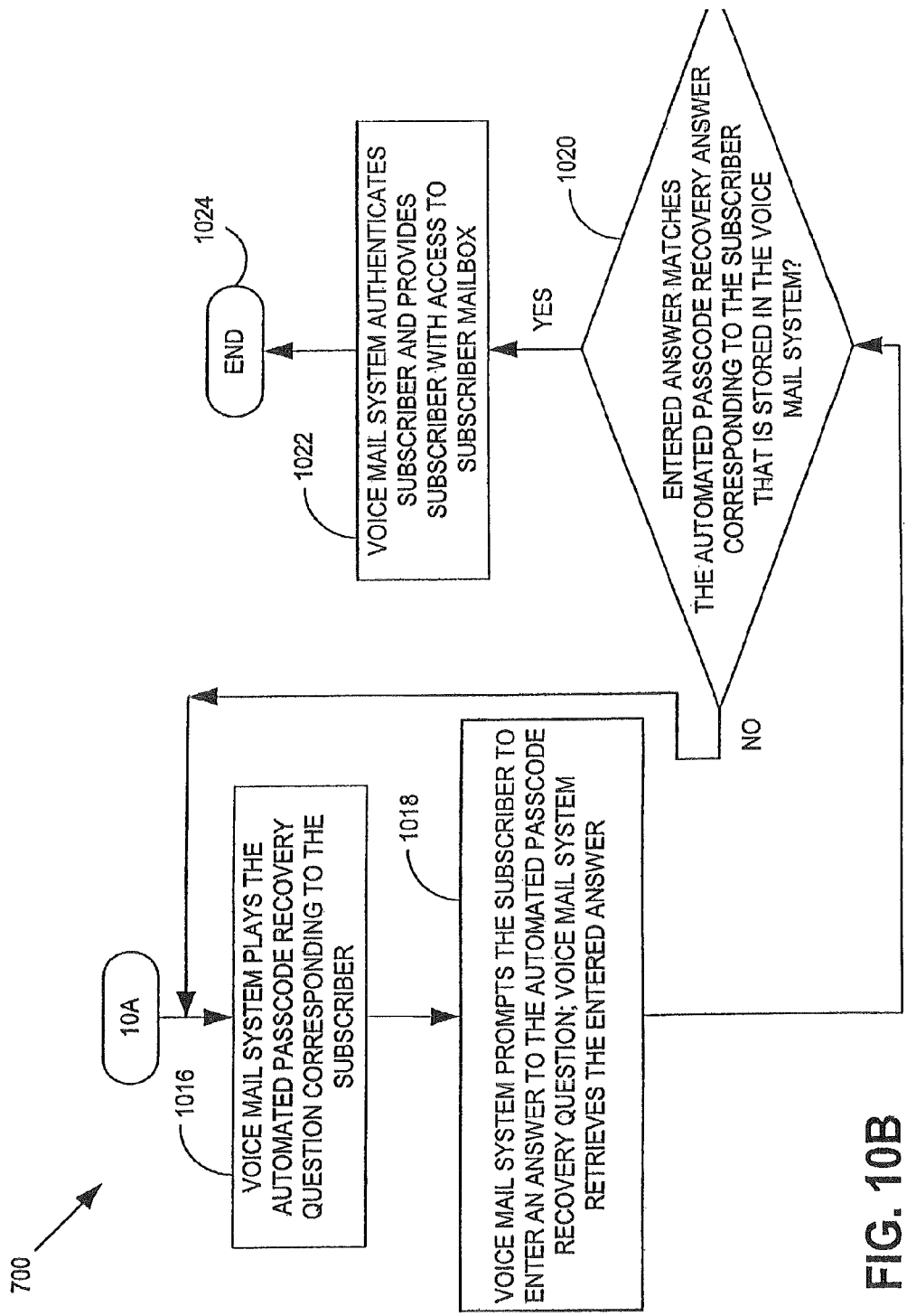
FIG. 10B is a second portion of the flow chart of FIG. 10A.

FIGS. 10A and 10B represent a flow chart illustrating the general operation of system 700, in which the subscriber 702 accesses the voice mail system 706 and recovers an authentication passcode via authentication passcode recovery system 104. After beginning at block 1000, at block 1002, the subscriber 702 establishes communication with voice mail system 706 via communication network 708. At block 1004, voice mail system 706 prompts the subscriber 702 to enter the authentication passcode corresponding to the subscriber 702. At block 1006, the subscriber 702 enters an authentication passcode. At decision block 1008, the voice mail system 706 determines whether the entered authentication passcode matches the authentication passcode stored in the voice mail system 706. If there is a match, the voice mail system authenticates the subscriber 702 and provides the subscriber 702 with access to the subscriber mailbox. If there is not a match, as shown in blocks 1012 and 1014, it is determined whether the automated passcode recovery process should be initiated.

In the event the automated passcode recovery process is initiated, at block 1016, the voice mail system plays the automated passcode recovery question corresponding to the subscriber 702. At block 1018, the voice mail system 706 prompts the subscriber 702 to enter an answer to the automated passcode recovery question and the voice mail system 706 retrieves the entered answer. At decision block 1020, the voice mail system 706 determines whether the entered answer matches the automated passcode recovery answer corresponding to the subscriber 702. If there is not a match, the process may be repeated at block 1016. If there is a match the voice mail system 706 may authenticate the subscriber 702 and provide the subscriber access to a subscriber mailbox 424. For example, in certain embodiments, automated passcode recovery system 104 may provide the authentication passcode to the subscriber. In this manner, the subscriber 702 may be subsequently authenticated when the proper authentication passcode is entered. In alternative embodiments, automated passcode recovery system 104 may automatically authenticate the subscriber 702 when the proper automated passcode recovery answer is entered.

Figure 11:
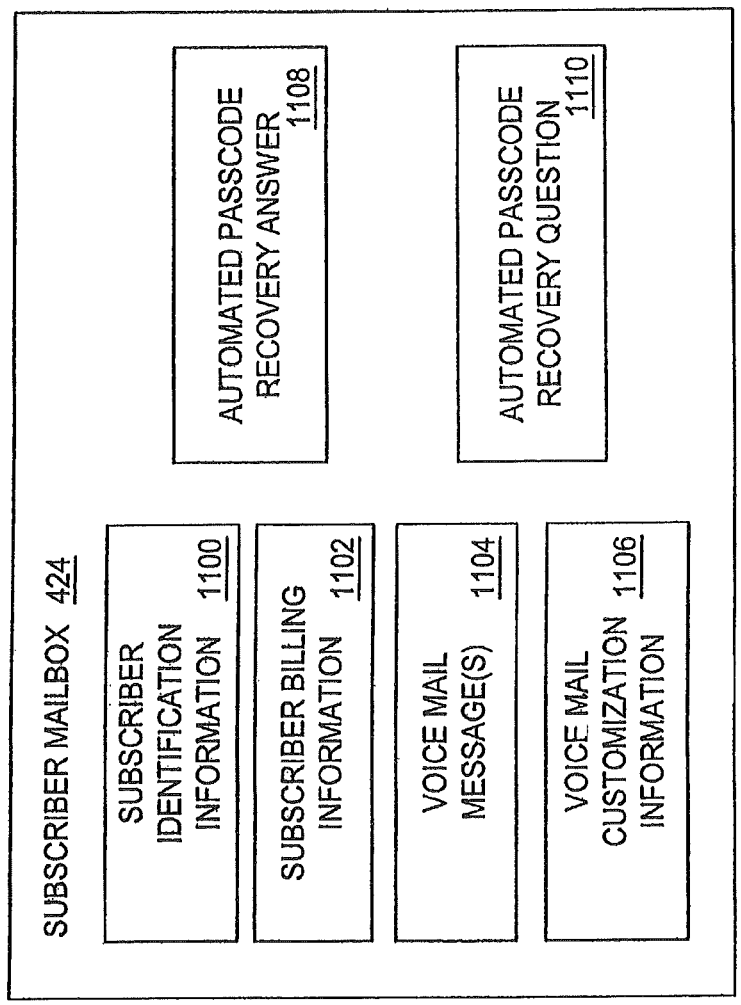
FIG. 11 is a block diagram of an embodiment of the customer information of FIG. 4 implemented in the voice mail system of FIG. 7.
Figure 12:
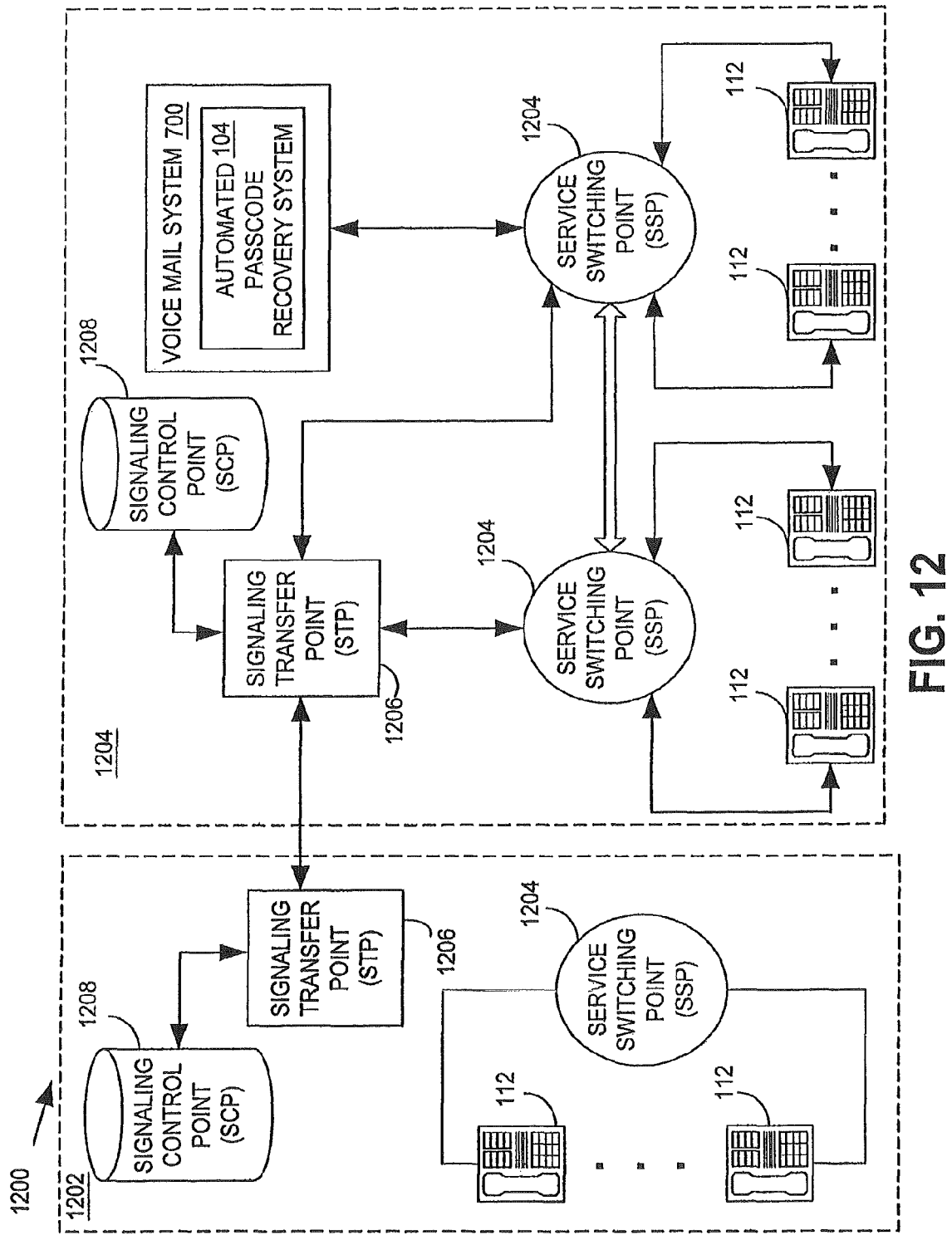
FIG. 12 is a block diagram of a system according to some embodiments of the present invention in which the automated passcode recover system can be implemented.

FIG. 11 is a block diagram illustrating the subscriber mailbox 424, which is stored in memory associated with the voice mail system 706. Subscriber mailbox 424 may comprise a portion 1100 configured to store subscriber identification information, such as, name, address, telephone number, etc. Subscriber mailbox 424 may further comprise: a portion 1102 configured to store subscriber billing information; a portion 1104 configured to store incoming voice mail messages; a portion 1106 configured to store voice mail customization information, such as, voice mail greetings, etc.; a portion 1108 configured to store the automated passcode recovery answer for the subscriber 702; and a portion 1110 configured to store the automated passcode recovery question for the subscriber 702.

It should be emphasized that any process descriptions or blocks in flow charts should be understood as representing steps in a process, functions, or (where implemented as logic in software, hardware, firmware, and any combination thereof) modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be further emphasized that the above-described embodiments of automated passcode recovery system 104, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

That which is claimed:

1. A method, comprising:
receiving a call from a caller at an interactive voice response system;
receiving a pre-determined number of times a non-auditory authentication passcode from the caller that does not match an authentication passcode corresponding to the caller;
providing to the caller, using the interactive voice response system, an automated auditory passcode recovery question responsive to receiving the pre-determined number of times the non-auditory authentication passcode from the caller that does not match the authentication passcode corresponding to the caller;
receiving an answer to the automated auditory passcode recovery question from the caller at the interactive voice response system; and
responsive to the answer from the caller matching a stored automated passcode recovery answer corresponding to the automated auditory passcode recovery question, authenticating the caller using the interactive voice response system;
wherein authenticating the caller comprises providing the authentication passcode to the caller.

2. The method of claim 1, wherein the auditory passcode recovery question is a recorded version of the caller's voice and wherein the recorded version of the caller's recorded voice comprises a facsimile that is one of a compressed, a digitized, and a machine form.

3. The method of claim 1, further comprising providing the caller access to services offered by the interactive voice response system after authenticating the caller.

4. A system, comprising:
an interactive voice response system comprising a processor; and
a computer readable medium comprising computer readable program code that when executed by the processor causes the processor to perform operations comprising:
receiving a call from a caller at an interactive voice response system;
receiving a pre-determined number of times a non-auditory authentication passcode from the caller that does not match an authentication passcode corresponding to the caller;
providing to the caller, using the interactive voice response system, an automated auditory passcode recovery question responsive to receiving the pre-determined number of times the non-auditory authentication passcode from the caller that does not match the authentication passcode corresponding to the caller;
receiving an answer to the automated auditory passcode recovery question from the caller at the interactive voice response system; and
responsive to the answer from the caller matching a stored automated passcode recovery answer corresponding to the automated auditory passcode recovery question, authenticating the caller using the interactive voice response system;
wherein authenticating the caller comprises providing the authentication passcode to the caller.

5. The system of claim 4, wherein the auditory passcode recovery question is a recorded version of the caller's voice and wherein the recorded version of the caller's recorded voice comprises a facsimile that is one of a compressed, a digitized, and a machine form.

6. The system of claim 4, wherein the operations further comprise providing the caller access to services offered by the interactive voice response system after authenticating the caller.

7. A computer program product, comprising:
a tangible computer readable storage medium comprising computer readable program code embodied in the medium that when executed by a processor causes the processor to perform operations comprising:
receiving a call from a caller at an interactive voice response system;
receiving a pre-determined number of times a non-auditory authentication passcode from the caller that does not match an authentication passcode corresponding to the caller;
providing to the caller, using the interactive voice response system, an automated auditory passcode recovery question responsive to receiving the pre-determined number of times the non-auditory authentication passcode from the caller that does not match the authentication passcode corresponding to the caller;
receiving an answer to the automated auditory passcode recovery question from the caller at the interactive voice response system; and
responsive to the answer from the caller matching a stored automated passcode recovery answer corresponding to the automated auditory passcode recovery question, authenticating the caller using the interactive voice response system;
wherein authenticating the caller comprises providing the authentication passcode to the caller.

8. The computer program product of claim 7, wherein the auditory passcode recovery question is a recorded version of the caller's voice and wherein the recorded version of the caller's recorded voice comprises a facsimile that is one of a compressed, a digitized, and a machine form.

9. The computer program product of claim 7, wherein the operations further comprise providing the caller access to services offered by the interactive voice response system after authenticating the caller.

* * * * *